(12) United States Patent
De Wergifosse et al.

(10) Patent No.: US 9,458,729 B2
(45) Date of Patent: Oct. 4, 2016

(54) ELECTRIC POWER SUPPLY FOR APPARATUSES SUPPORTED BY THE ROTOR OF AN AIRCRAFT ENGINE

(75) Inventors: Eric De Wergifosse, Saint Augustin (FR); Cedric Duval, Samois sur Seine (FR)

(73) Assignee: LABINAL POWER SYSTEMS, Blagnac (FR)

( * ) Notice: Subject to any disclaimer, the term of this patent is extended or adjusted under 35 U.S.C. 154(b) by 894 days.

(21) Appl. No.: 13/704,462

(22) PCT Filed: Jun. 8, 2011

(86) PCT No.: PCT/FR2011/051301
§ 371 (c)(1),
(2), (4) Date: Mar. 8, 2013

(87) PCT Pub. No.: WO2011/157924
PCT Pub. Date: Dec. 22, 2011

(65) Prior Publication Data
US 2013/0177421 A1    Jul. 11, 2013

(30) Foreign Application Priority Data

Jun. 15, 2010    (FR) ...................................... 10 54711

(51) Int. Cl.
| | |
|---|---|
| *F01D 7/00* | (2006.01) |
| *B64C 11/30* | (2006.01) |
| *B64D 15/12* | (2006.01) |
| *B64D 27/00* | (2006.01) |

(52) U.S. Cl.
CPC .............. *F01D 7/00* (2013.01); *B64C 11/306* (2013.01); *B64D 15/12* (2013.01); *B64D 2027/005* (2013.01); *Y02T 50/66* (2013.01)

(58) Field of Classification Search
CPC ................ B64C 11/306; B64D 15/12; B64D 2027/005; F01D 7/00; Y02T 50/66
USPC ........................................... 416/95, 129, 155
See application file for complete search history.

(56) References Cited

U.S. PATENT DOCUMENTS

| | | | |
|---|---|---|---|
| 4,591,313 | A | 5/1986 | Miyatake et al. |
| 5,281,094 | A | 1/1994 | McCarty et al. |
| 7,172,391 | B2 * | 2/2007 | Carvalho ................ B64C 11/38 |
| | | | 416/1 |

(Continued)

FOREIGN PATENT DOCUMENTS

| | | |
|---|---|---|
| EP | 2 128 403 | 12/2009 |
| EP | 2 163 474 | 3/2010 |

(Continued)

OTHER PUBLICATIONS

International Search Report Issued Oct. 31, 2011 in PCT/FR11/051301 Filed Jun. 8, 2011.

*Primary Examiner* — Jesse Bogue
*Assistant Examiner* — Dapinder Singh
(74) *Attorney, Agent, or Firm* — Oblon, McClelland, Maier & Neustadt, L.L.P.

(57) ABSTRACT

An aircraft engine including: a stator; a main shaft; a first rotor; a second rotor; a transmission mechanism; a first electrical apparatus supported by the first rotor and a second electrical apparatus supported by the second rotor; at least one first field winding supported by the stator; a control unit configured to circulate direct electric current in the first field winding; at least one first armature winding supported by the first rotor and connected to the first electrical apparatus and at least one second armature winding supported by the second rotor and connected to the second electrical apparatus.

7 Claims, 5 Drawing Sheets

(56) References Cited

U.S. PATENT DOCUMENTS

2009/0289516 A1 11/2009 Hopewell et al.
2010/0021295 A1 1/2010 Perkinson et al.
2010/0068056 A1 3/2010 Gainford et al.

FOREIGN PATENT DOCUMENTS

| GB | 525 452 | 8/1940 |
| GB | 2 016 598 | 9/1979 |
| GB | 2 461 786 | 1/2010 |

* cited by examiner

ELECTRIC POWER SUPPLY FOR APPARATUSES SUPPORTED BY THE ROTOR OF AN AIRCRAFT ENGINE

BACKGROUND OF THE INVENTION

The invention relates to supplying electric power to electrical devices carried by the rotor of an aircraft engine.

The field of application of the invention is more particularly that of aircraft engines, especially gas turbine engines. In particular, the invention relates to an unducted fan engine, comprising two counter-rotating rotors, each carrying adjustable blades.

There are engines in which the rotor bears adjustable blades. The orientation of the blades can be modified during flight to enable optimised operation of the engine. This is especially the case of engines of the unducted fan engine type (Open Rotor), comprising two counter-rotating rotors, each carrying adjustable blades. For example, the orientation of the blades can be modified by an electromechanical actuator supported by the rotor.

Electric power must be transmitted to the rotor to feed such an actuator. For this, a brush device is typically used. However, brush devices are generally less reliable and subject to rapid wear. They therefore need regular maintenance. Also, they are generally heavy and bulky and can raise compatibility problems with surrounding oils.

To solve these problems, document FR 2 712 250 proposes using an electric engine, the stator of which is fixed and the rotor of which has no electrical link to the stator and is attached to a toothed wheel connected mechanically to the blades to be oriented. This solution therefore imposes a mechanical link between the electric engine and the blades. The fixed part of the electric engine therefore cannot be positioned freely, which involves design restrictions. Also, no electric power is available at the rotor level to feed electrical devices. The same document therefore also proposes using a rotating transformer for feeding a lock.

When the power to be transmitted is high, a rotating transformer is generally a heavy and bulky device. Also, it is necessary to feed it from a source having a power which corresponds to the power required at the rotor level. A power converter and a power source dimensioned for high power are necessary.

OBJECT AND SUMMARY OF THE INVENTION

The aim of the invention is to provide an adjustable-blade aircraft engine which dispenses with at least some of the disadvantages of the abovementioned prior art. In particular, an aim of the invention is to transmit electric power to the rotors of an engine with counter-rotating rotors, reliably and without needing a heavy and bulky device.

For this purpose, the invention proposes an aircraft engine comprising:
- a stator,
- a main shaft, a first rotor and a second rotor,
- a transmission mechanism capable of converting rotation of the main shaft into rotation of the first rotor in a first direction and into rotation of the second rotor in a second direction opposite said first direction,
- at least one first electrical device carried by the first rotor and at least one second electrical device carried by the second rotor, characterised in that it comprises:
- at least one first field winding carried by the stator,
- a control unit capable of causing direct electric current to flow in said first field winding,
- at least one first armature winding carried by the first rotor and connected to said first electrical device and at least one second armature winding carried by the second rotor and connected to said second electrical device.

Because of these characteristics, it is not necessary to use a brush device to transmit power to the rotor. Indeed, along with the first armature winding and/or with the second armature winding, the first field winding forms a synchronous generator producing electric power available at the rotor level.

According to an embodiment, in one position of the main shaft, said first field winding is disposed between the first armature winding and the second armature winding.

In this case, the first field winding is common to the armature windings, limiting bulk.

The first field winding can exhibit an axis oriented parallel to the axis of rotation of the main shaft.

According to another embodiment, the engine comprises at least one second field winding carried by the stator, and in which, for one position of the main shaft, the first field winding faces the first armature winding and the second field winding faces the second armature winding.

In this case, the first field winding and the first armature winding form a synchronous generator producing electric power available at the level of the first rotor. Correspondingly, the second field winding and the second armature winding form a synchronous generator producing electric power available at the level of the second rotor. The control unit can adjust the direct current of each generator independently, as a function of the electric power to be produced for each rotor.

The first field winding and the second field winding can be located side by side in an axial direction. The first field winding and the second field winding can also be located at the same distance from the main shaft in a radial direction.

This limits the space occupied by the windings in a radial direction.

According to a variant, the first field winding and the second field winding are located at a same location in an axial direction and at different distances from the main shaft in a radial direction.

This arrangement limits the space occupied in an axial direction.

The control unit can be fed by a permanent magnet generator and/or by an onboard network.

The permanent magnet generator ensures autonomy of the function.

According to an embodiment, the control unit is capable of causing alternating electric current to flow in said first field winding.

Thus, even when the main shaft is idling or is turning at low speed, electric power can be transmitted to the rotors due to the windings running in transformer mode.

In the synchronous generator operating mode, the field winding or the field windings only generate the magnetic flux of the generator. Consequently, the electric power available at the level of the armature windings is drawn mechanically from the main shaft and the rotors. The power required to supply the field winding corresponds only to a minor fraction of the electric power available at the level of the rotors, which is favourable to the dimensioning of the control unit.

In the transformer operating mode, the power available at the level of the rotor armature windings originates almost exclusively from the power injected into the stator field winding or the stator field windings. If the power required at low speed must be maintained at the same level, with this transformer operating mode, this will involve a dimensioning for the power of the control unit. However, in the majority of cases, the rotor devices (defrosing and blade-adjustment actuator) will require much less power at low rotation speeds, since this is far from their nominal operating condition. Therefore, this transformer operating mode of machines will not lead to overdimensioning of the control unit. In the event where the feed of the control unit can be achieved from an alternative network, such as a power network 3×115 Vac 400 Hz~800 Hz, the latter can directly feed the stator field windings with alternating current, simplifying the control unit which no longer will have to include an inverter stage.

According to an embodiment, said at least one first electrical device comprises a first electromechanical actuator capable of modifying the orientation of a blade carried by the first rotor, and said at least one second electrical device comprises a second electromechanical actuator capable of modifying the orientation of a blade carried by the second rotor.

Said at least one first electrical device can comprise a first anti-icing device, and said at least one second electrical device can comprise a second anti-icing device.

According to an embodiment, the engine comprises at least one second field winding carried by the first rotor and connected to said first armature winding. For one position of the main shaft, the second field winding faces the second armature winding.

In this embodiment, the second field winding and the second armature winding form an electric machine producing power at the second rotor level, without the stator needing additional field winding.

BRIEF DESCRIPTION OF THE DRAWINGS

The invention will be more clearly understood from the following description, by way of indication though of non-limitation, in reference to the attached drawings, in which.

DETAILED DESCRIPTION OF EMBODIMENTS

Figure 1:
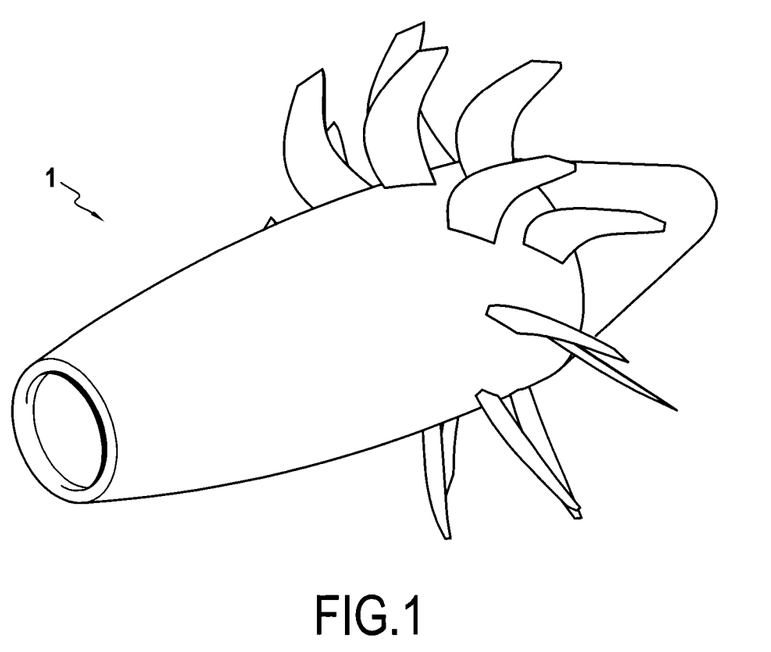
FIG. 1 is a perspective view of an aircraft engine according to an embodiment of the invention.
Figure 2:
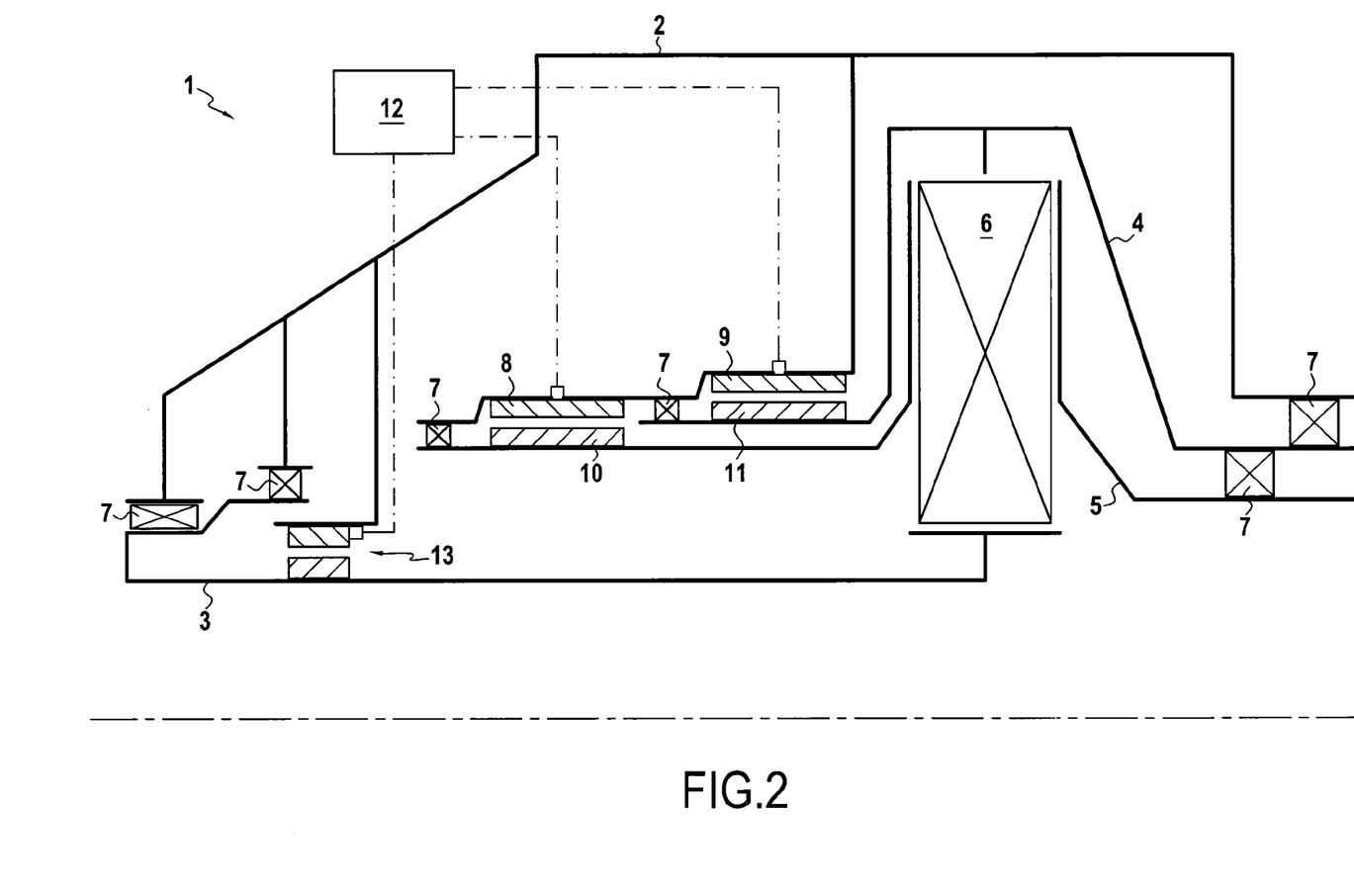
FIG. 2 is a partial sectional view of the engine of FIG. 1, FIGS. 3 to 7 are views similar to FIG. 2, showing other embodiments.

FIG. 1 illustrates a perspective view of an aircraft engine 1, shown highly schematically. The engine 1 is an engine of the unducted fan engine type having two counter-rotating rotors. Each rotor carries adjustable blades. The view of FIG. 2 schematically illustrates the part of the engine 1 at the level of a transmission mechanism (Power Gear Box) for converting rotation of a main shaft into rotation of the rotors in two opposite directions.

The engine 1 comprises a housing 2 on which a stator is fixed, and a main shaft 3 driven in rotation for example by a gas turbine (not shown). The engine 1 also comprises a rotor 4 and a rotor 5. Bearings 7 enable rotation of the main shaft 3 and of the rotors 4 and 5 relative to the housing 2.

A transmission mechanism 6 connects the main shaft 3 to the rotor 4 and to the rotor 5. More precisely, when the main shaft 3 turns in a first direction, the transmission mechanism 6 drives the rotor 5 in the same first direction and the rotor 4 in a second opposite direction. The transmission mechanism 6 also reduces the rotation speed. Therefore, for example for a typical rotation speed of the main shaft 3 of +6000 rpm the rotor 5 turns at a speed of +900 rpm and the rotor 4 turns at a speed of −900 rpm.

The rotor 4 carries adjustable blades (not shown). An electromechanical actuator (not shown) carried by the rotor 4 allows the orientation of these blades to be modified. The rotor 4 also carries an anti-icing device (not shown) comprising electrical resistors integrated with the blades. The rotor 5 correspondingly carries adjustable blades, an electromechanical actuator and an anti-icing device. By way of variant, the rotors 4 and 5 carry non-adjustable blades.

The elements enabling electric power to be supplied to the electrical devices carried by the rotors 4 and 5, specifically the electromechanical actuators and the abovementioned deicing devices, will now be described.

FIG. 2 illustrates a field winding 8 carried by the stator of the housing 2 and an armature winding 10 carried by the rotor 5. In the illustrated position of the main shaft 3, the field winding 8 and the armature winding 10 are facing each other. The armature winding 8 is connected to the electrical devices carried by the rotor 5. Correspondingly, the stator of the housing 2 carries a field winding 9 facing an armature winding 11 carried by the rotor 4. The armature winding 11 is connected to the electrical devices supported by the rotor 4.

In practice, each one of the field windings 8 and 9 and armature windings 10 and 11 forms part of a set of respective windings, distributed circumferentially. When reference is made to a winding hereinbelow, it should be understood that this designates the set of windings of which it forms part.

A control unit 12 is connected to the field windings 8 and 9. The control unit 12 is fed by a permanent magnet generator 13 mounted on the main shaft 3 and on the housing 2. In addition or in place of supply by the generator 13, the control unit 12 can be fed from an onboard power network of the aircraft.

The operation of the engine 1 will now be described.

When the main shaft 3 of the engine 1 rotates, it drives the rotation of the rotors 4 and 5. Therefore, the armature windings 10 and 11 rotate and run in front of the field windings 8 and 9. The control unit 12 is fed from the generator 13 and/or the onboard network and supplies the field windings 8 and 9 with direct current.

Due to the magnetic fields generated by the field windings 8 and 9 and the rotation of the rotors 4 and 5, electrical voltage is generated in the armature windings 10 and 11. In other words, the field winding 8 and the armature winding 10 form a synchronous generator producing alternating voltage available at the level of the rotor 5. The field winding 9 and the armature winding 11 correspondingly form a synchronous generator producing alternating voltage available at the level of the rotor 4. The control unit 12 can adjust the voltage and direct current magnitudes in the field windings 8 and 9 so that the power available at the rotors 4 and 5 corresponds to the required power levels.

The resulting alternating voltages feed the electrical devices carried by the rotors 4 and 5. More precisely, for each rotor, the anti-icing device can have a simple structure, comprising wires, connecting elements and resistive heating elements. It can be fed directly from the armature windings, without the need for power electronics carried by the rotor. The electromechanical blade-adjusting actuator can be fed from the armature windings via a power converter carried by the rotor.

Thus, there is no need to use brush devices to feed the electrical devices supported by the rotors 4 and 5. Also, upon design of the engine 1, the windings can be positioned independently of the electrical devices to be fed and the blades, since the electric power can easily be transported to the rotors 4 and 5 via wiring.

It is also possible to feed the electrical devices carried by the rotors 4 and 5 when the engine 1 is not running, that is, when the main shaft 3 and the rotors 4 and 5 are not rotating relative to the housing 2. For this, the control unit 12 feeds the field windings 8 and 9 with alternating voltage. The field winding 8 and the armature winding 10 then form a transformer transmitting alternating voltage available at the level of the rotor 5. The field winding 9 and the armature winding 11 correspondingly form a transformer which transmits alternating voltage available at the level of the rotor 4. This transformer operating mode can also be used at low rotation speed when rotation of the rotors 4 and 5 does not produce sufficient voltage in a synchronous generator operating mode.

During the synchronous generator operating mode, the required electric power levels at the rotors 4 and 5 are essentially drawn on the rotation of the main shaft 3. The electric power to be provided by the control unit 12 to feed the field windings 8 and 9 with direct voltage is not very high.

Also, the transformer operating mode can be used essentially during maintenance phases when the plane is on the ground, for example to check correct operation of the electromechanical blade-adjusting actuators and of the associated power electronics. In this case, the aerodynamic forces exerted on the blades are not very high. Also, in these situations, deicing is not used or is used at low power. The electric power to be provided by the control unit 12 to feed the field windings 8 and 9 with alternating voltage is accordingly not very high.

It can be seen that, in both operating modes the control unit 12 is not required to supply high electrical output. The control unit 12 can therefore be dimensioned for low electrical output, resulting in reduced mass and bulk. The control unit 12 therefore does not generate high thermal losses and can be placed in a zone of the aircraft offering good operating conditions, known as "controlled zone".

Figure 3:
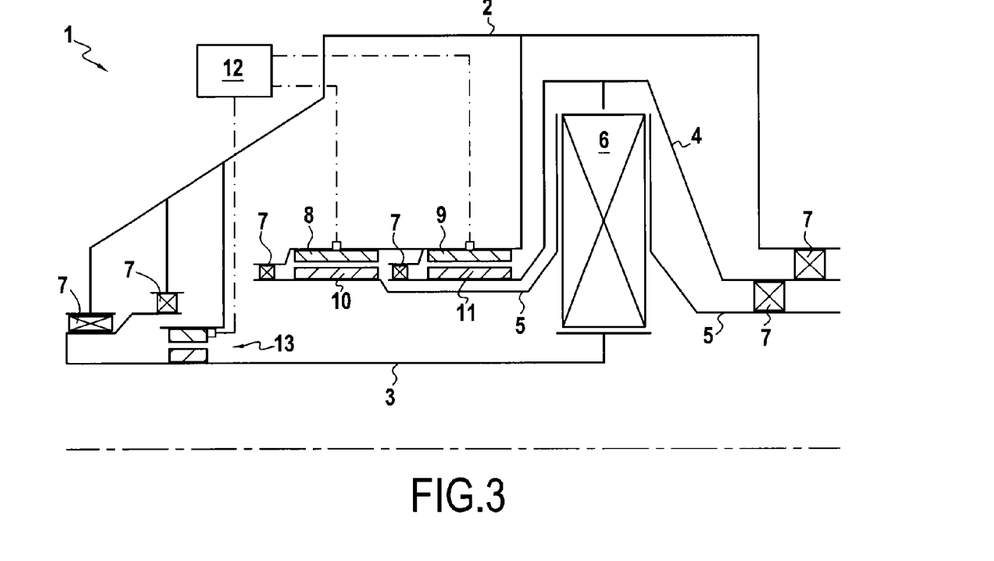
Figure 4:
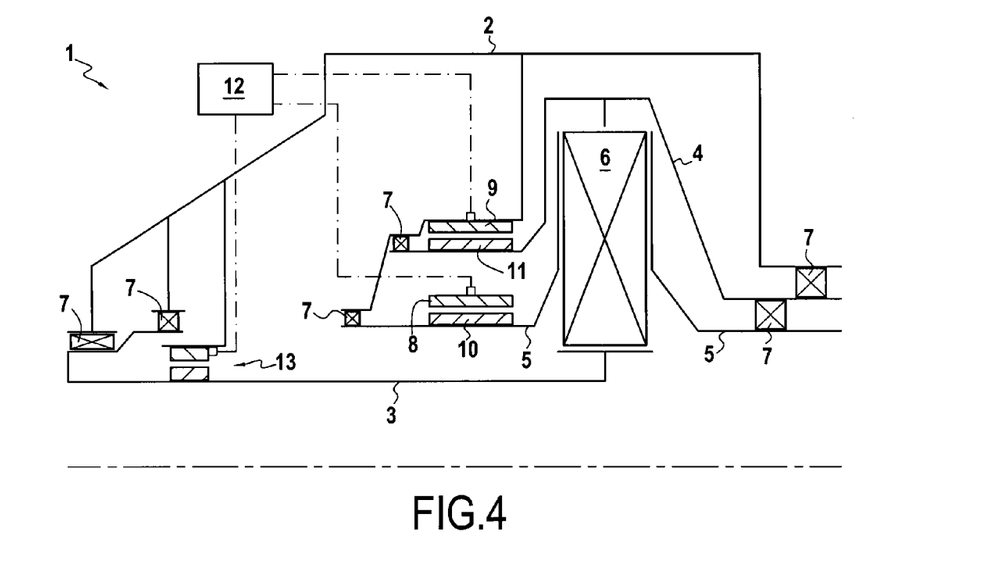
Figure 5:
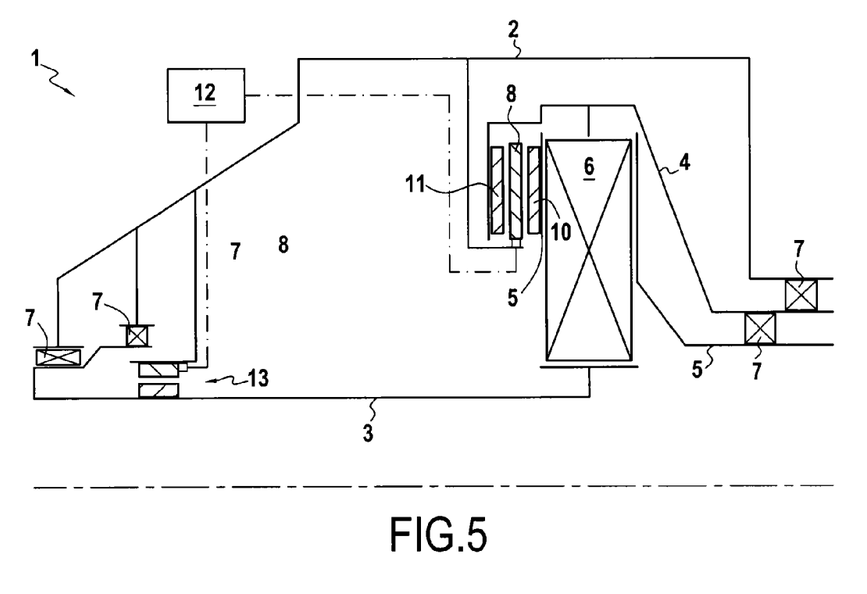

FIGS. 3 to 5 are figures similar to FIG. 2 and illustrate other embodiments. In these figures, elements identical or similar to elements of FIG. 2 are designated by the same reference numerals and are not described in further detail.

The embodiment of FIG. 3 is almost identical to that of FIG. 2. In FIG. 3, the field windings 8 and 9 are located side by side in an axial direction, that is, a direction parallel to the axis of rotation of the main shaft 3 and of the rotors 4 and 5. The field windings 8 and 9 are also located at the same distance from the main shaft 3 in a radial direction. Similarly, the armature windings 10 and 11 are located side by side in an axial direction, and at the same distance from the main shaft 3 in a radial direction. By comparison, in FIG. 2 the field winding 9 and the armature winding 11 are slightly further away from the main shaft 3 than the field winding 8 and the armature winding 10 respectively. The arrangements of FIGS. 2 and 3 limit the space occupied by the windings in a radial direction.

In the embodiment of FIG. 4, in an axial direction, the field windings 8 and 9 and the armature windings 10 and 11 are located in a same location. In a radial direction, the field winding 9 and the armature winding 11 are further away from the shaft than the field winding 8 and the armature winding 10. This arrangement limits the space occupied by the windings in an axial direction.

In the embodiment of FIG. 5, the engine 1 comprises a field winding 8 which, in the illustrated position of the main shaft 3, faces the armature windings 10 and 11. In other words, along with the armature winding 10, the field winding 8 forms a first synchronous generator and, with the armature winding 11, forms a second synchronous generator. The field winding 8 is common to the two generators. By limiting the number of windings used, the arrangement of FIG. 5 reduces the weight and the bulk of the windings.

In addition, the orientation of the windings in FIG. 5 is different to that in FIGS. 2 to 4. The magnetic flux is generated in an axial and non-radial direction. This different orientation allows the space to be occupied differently. The choice of the orientation allows the place available to be taken into account during designing of the engine 1.

The operation of the embodiment of FIG. 5 is substantially identical to that of the embodiment of FIG. 2. However, it is not possible to generate different electric power for each rotor, as is the case in the preceding embodiments where the control unit 12 can cause currents of different magnitudes to circulate in the field winding 8 and in the field winding 9.

Figure 6:
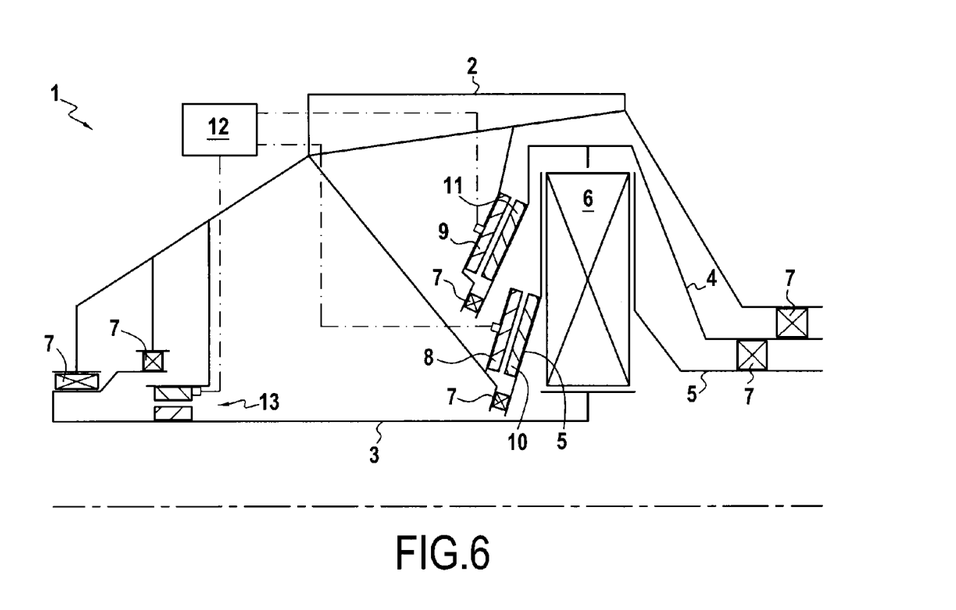

In the embodiment of FIG. 6, the windings 8 to 11 are oriented neither radially nor axially relative to the main shaft 3. This arrangement enables specific integration, limiting the bulk and taking into account design restrictions.

Figure 7:
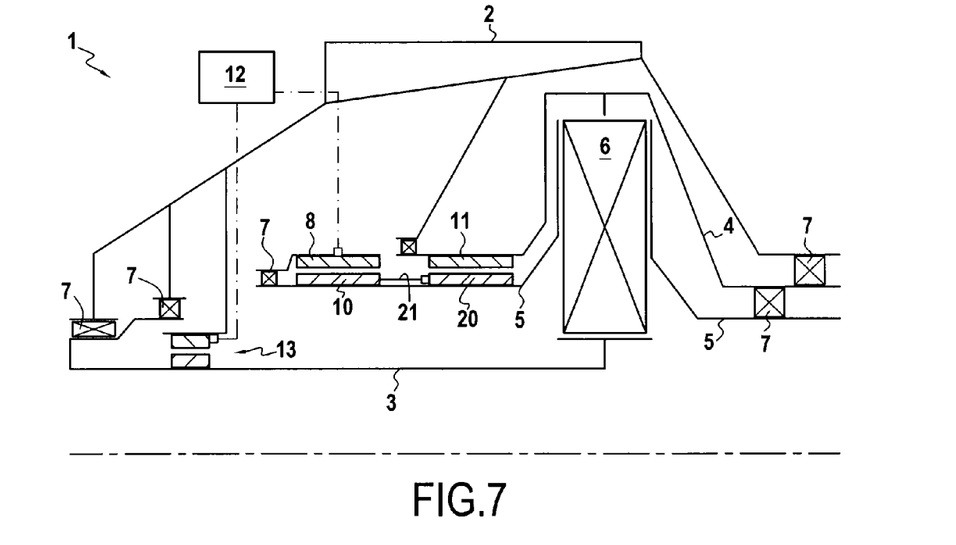

In the embodiment of FIG. 7, the rotor 5 supports a field winding 20 connected to the armature winding 10 by a connection 21. In the position illustrated, the field winding 20 faces the armature winding 11 of the rotor 4.

According to a first variant, the connection 21 can comprise a bridge rectifier formed by diodes. In this case, the field winding 20 is fed with direct current. The relative rotation of the rotors 4 and 5 enables generation of electric power in the armature winding 11.

According to another variant, the connection 21 can directly connect the armature winding 10 to the field winding 20. In this case, the field winding 20 is fed with alternating current and generates a rotating magnetic field. The rotating field and the relative rotation of the rotors 4 and 5 enable generation of electric power in the armature winding 11 according to a double airgap speed relative to the first variant above.

The invention claimed is:

1. An aircraft engine comprising:
   a stator;
   a main shaft, a first rotor, and a second rotor;
   a transmission mechanism configured to convert rotation of the main shaft into rotation of the first rotor in a first direction and into rotation of the second rotor in a second direction opposite the first direction;
   at least one first electrical device carried by the s rotor and at least one second electrical device carried by the second rotor;
   at least one first field winding carried by the stator;
   a control unit configured to cause direct electric current to flow in first field winding; and
   at least one first armature winding carried by the first rotor and connected to the first electrical device and at least one second armature winding carried by the second rotor and connected to the second electrical device;
   the first field winding being disposed between the first armature winding and the second armature winding.

2. An engine according to claim 1, in which the first field winding has an axis oriented parallel to the axis of rotation of the main shaft.

3. An engine according to claim 1, in which the control unit is fed by a permanent magnet generator.

4. An engine according to claim 1, in which the control unit is fed by an onboard network.

5. An engine according to claim 1, in which the control unit is configured to cause alternating electric current to flow in the first field winding.

6. An engine according to claim 1, in which the at least one first electrical device comprises a first electromechanical actuator configured to modify orientation of a blade carried by the first rotor, and the at least one second electrical device comprises a second electromechanical actuator configured to modify orientation of a blade carried by the second rotor.

7. An engine according to claim 1, in which the at least one first electrical device comprises a first anti-icing device, and the at least one second electrical device comprises a second anti-icing device.

* * * * *